United States Patent
Meverden et al.

(10) Patent No.: US 6,762,255 B2
(45) Date of Patent: Jul. 13, 2004

(54) PREALKYLATED OLEFIN POLYMERIZATION CATALYSTS AND OLEFIN POLYMERIZATION EMPLOYING SUCH CATALYSTS

(75) Inventors: Craig C. Meverden, Mason, OH (US); Michael W. Lynch, West Chester, OH (US)

(73) Assignee: Equistar Chemicals L.P., Houston, TX (US)

( * ) Notice: Subject to any disclaimer, the term of this patent is extended or adjusted under 35 U.S.C. 154(b) by 36 days.

(21) Appl. No.: 10/163,703

(22) Filed: Jun. 6, 2002

(65) Prior Publication Data

US 2003/0228971 A1 Dec. 11, 2003

(51) Int. Cl.⁷ .................................................. C08F 4/44
(52) U.S. Cl. ...................... 526/110; 526/127; 526/129; 526/130; 526/152; 526/153; 502/103; 502/118
(58) Field of Search ................................. 502/103, 118, 502/129, 132; 526/129, 130, 153, 134

(56) References Cited

U.S. PATENT DOCUMENTS

| | | |
|---|---|---|
| 4,003,712 A | 1/1977 | Miller |
| 5,064,802 A | 11/1991 | Stevens et al. |
| 5,153,157 A | 10/1992 | Hlatky et al. |
| 5,198,401 A | 3/1993 | Turner et al. |
| 5,241,025 A | 8/1993 | Hlatky et al. |
| 5,332,706 A | 7/1994 | Nowlin et al. |
| 5,384,299 A | 1/1995 | Turner et al. |
| 5,408,017 A | 4/1995 | Turner et al. |
| 5,414,180 A | 5/1995 | Geerts et al. |
| 5,470,927 A | 11/1995 | Turner et al. |
| 5,637,660 A | 6/1997 | Nagy et al. |
| 5,648,440 A | 7/1997 | Sugano et al. |
| 6,232,260 B1 | 5/2001 | Nagy et al. |
| 6,291,386 B1 | 9/2001 | Wang |
| 6,376,629 B2 | 4/2002 | Nagy et al. |
| 6,403,736 B1 * | 6/2002 | Wang .......................... 526/160 |
| 6,444,765 B1 * | 9/2002 | Meverden .................... 526/153 |
| 2002/0013218 A1 * | 1/2002 | Meverden et al. .......... 502/103 |

FOREIGN PATENT DOCUMENTS

WO    WO 00/40623 A1  *  7/2000  ......... C08F/210/02

* cited by examiner

Primary Examiner—David W. Wu
Assistant Examiner—Rip A Lee
(74) Attorney, Agent, or Firm—Brooks Kushman P.C.

(57) ABSTRACT

Prealkylation of a supported catalyst system comprising a transition metal or inner transition metal complex precatalyst and a bulky, non-coordinating anion on an inorganic support by treatment with a solution of metal alkyl in a ratio of metal of metal alkyl to transition metal or inner transition metal of precatalyst less than 20:1, and in an amount of solution insufficient to form a paste or dispersion provides supported catalysts of high olefin polymerization activity which promote production of polyolefins of low polydispersity and improved morphology.

19 Claims, No Drawings

PREALKYLATED OLEFIN POLYMERIZATION CATALYSTS AND OLEFIN POLYMERIZATION EMPLOYING SUCH CATALYSTS

BACKGROUND OF THE INVENTION

1. Field of the Invention

The present invention pertains to supported olefin polymerization catalysts employing a single site precatalyst, an ionic activator, and a metal alkyl alkylating agent, and olefin polymerization processes employing such catalysts.

2. Background Art

Olefin polymerization for many years involved the use of so-called Ziegler-Natta transition metal catalysts and related transition metal complexes. Such catalysts generally required an "activator" such as a trialkylaluminum compound for olefin polymerization. Large quantities of polyethylene are still prepared using such processes.

In the decade of the 1970's, it was discovered that organometallic compounds such as bis(cyclopentadienyl) complexes of titanium, zirconium, and hafnium are also olefin polymerization catalysts, but their polymerization activity was very low with traditional activators. Instead, a variety of organoalumoxanes, particularly methylalumoxane, were discovered to be efficient activators. These catalysts have been termed "single site catalysts," as polymer growth is believed to be initiated and promulgated from individual catalytic sites, each site corresponding to a well structured "precatalyst" derived site. The term "precatalyst" may be used to emphasize that the metal complex itself is not usually the active catalytic species. Rather, the active catalyst is obtained following reaction with one or more of the additional active ingredients of the catalyst system, i.e. alumoxane, trialkylaluminum, and/or source of bulky, non-coordinating anionic ligand as described hereafter.

In U.S. Pat. Nos. 5,408,017; 5,198,401; 5,599,761; 5,470,927; 5,384,299; and 5,064,802, alternative catalyst systems are disclosed which employ single site catalysts activated by bulky, non-coordinating anions such as the tetrakis (pentafluorophenyl)borate anion and anions derived from Bronsted acids. These catalyst systems, unlike those activated by alumoxane, generally employed trialkylaluminum as a "coactivator," "cocatalyst," or "scavenger," added as a feed stream to the polymerization reactor. Uncertainty in the actual function of trialkylaluminum compounds and related compounds is reflected in the variety of terms used to describe them. These terms are viewed as synonyms herein unless indicated otherwise.

Considerable research has been devoted to single site catalysts which have been activated with alumoxanes as "cocatalysts" or "activators." In solution polymerization, the alumoxanes may be added separately to the polymerization reactor; may be mixed with the "precatalyst" in large excess to form a catalyst solution, generally in organic solvent; or may be prereacted with limited quantities of alumoxane and isolated as a solid catalyst prior to introduction into the reactor.

In slurry and gas phase polymerization, however, supported catalysts are used. Supported catalysts are prepared by treating a finely divided, porous inorganic support, preferably silica, with the precatalyst or with both precatalyst and activator. Thus numerous possibilities exist for the preparation of alumoxane-activated supported catalysts, including, inter alia, deposition of only precatalyst on the support, the alumoxane being added directly to the polymerization reactor, and deposition of both precatalyst and alumoxane on the support.

In U.S. Pat. No. 5,332,706, it is disclosed that catalyst activity is enhanced if alumoxane and precatalyst are first contacted in solution, and this solution is added to porous silica in a quantity such that the solution volume relative to the pore volume of silica prevents obtaining a paste or slurry. This process may be termed an "incipient wetness" process. The incipient wetness process has not been uniformly used, even with alumoxane cocatalysts.

In the case of bulky anion-activated precatalysts, the trialkylaluminum "cocatalyst" or "activator" has been added to the polymerization reactor as a separate stream to alkylate the precatalyst in situ, or in a feed stream with a large volume of alkylating agent solution, for example as disclosed in copending U.S. application Ser. No. 6,291,386, herein incorporated by reference. Although polymerization activity increased, polymer bulk density, an important parameter, was not optimal, in some cases showing a considerable decrease in bulk density.

It would be desirable to provide a supported catalyst which maintains or increases polymerization activity relative to precatalyst content, which maintains its activity during storage, which can provide polymer bulk density which is improved over other methods of catalyst preparation, and/or which can provide polymer products with lower polydispersity.

SUMMARY OF THE INVENTION

It has now been surprisingly and unexpectedly discovered that a catalytic system comprising a metal complex single site precatalyst and a bulky, non-coordinating anionic ligand, when alkylated in the presence of a support by an incipient wetness technique, produces a supported catalyst whose activity is higher than the catalytic activity obtained when alkylating agent is added separately to the polymerization reactor, and can generate polymer with both lower polydispersity as well as improved polymer particle morphology as manifested by polymer bulk density.

DETAILED DESCRIPTION OF THE PREFERRED EMBODIMENTS

The supported catalysts of the present invention are prepared by depositing a transition metal complex precatalyst and a source of a bulky, non-coordinating activating anion on a porous support, following which the catalyst is "prealkylated" by addition of a solution of an alkylating agent by an incipient wetness technique.

Examples of suitable catalysts include mono-, bis- and tris-cyclopentadienyl transition metal complexes; transition metal complexes containing multidentate ligands such as the quinolinoxy catalysts disclosed in U.S. Pat. No. 5,637,660; the idenoindolyl transition metal complexes disclosed in U.S. Pat. Nos. 6,232,260 and 6,376,629; and the catalysts disclosed in the previously mentioned U.S. Pat. Nos. 5,408,017; 5,198,401; 5,599,761; 5,470,927; 5,384,299; and 5,064,802. This list is exemplary and not limiting. Preferred transition metals of the transition metal single site "precatalysts" include, without limitation, zirconium, titanium, and hafnium.

Suitable ionic activators include acid salts that contain non-nucleophilic anions. These compounds generally consist of bulky ligands attached to boron or aluminum.

Examples include lithium tetrakis(pentafluorophenyl) borate, lithium tetrakis(pentafluorophenyl)aluminate, anilinium tetrakis(pentafluorophenyl)borate, and the like. Suitable activators include substituted and unsubstituted trialkyl and triarylboranes such as tris(pentafluorophenyl) borane, triphenylborane, tri-n-octylborane, and the like. These and other suitable boron-containing activators are described in U.S. Pat. Nos. 5,153,157; 5,198,401; and 5,241,025, the teachings of which are incorporated herein by reference. Suitable activators also include aluminoboronates, reaction products of alkyl aluminum compounds and organoboronic acids, as described in U.S. Pat. Nos. 5,414,180 and 5,648,440, the teachings of which are incorporated herein by reference. Further suitable activators are disclosed in U.S. Pat. No. 5,064,802, also incorporated herein by reference.

The support may be any inorganic porous support which allows for loadings of catalyst and other components which allow the supported catalystto provide significant catalytic activity. Most preferably, the supports are rather finely divided supports which have been calcined or otherwise treated to reduce the amount of hydroxyl-functionality. Such supports include silica, alumina, and a variety of aluminum silicates and metal aluminum silicates. Titanium silicates, titania, and other supports are also useful. Most preferable is silica such as Davison 948 and 955 silicas, whose surface hydroxyl groups have been reduced by calcining, or by both treatment with hydrophobicizing agents such as hexamethyldisilazane or trimethylmethoxysilane followed by calcining. Supports preferably have mean particle sizes between 10 $\mu$m and 500 $\mu$m, more preferably between 10 $\mu$m and 200 $\mu$m, and pore volumes between 0.1 $cm^3/g$ and 5 $cm^3/g$, most preferably between 1 $cm^3/g$ and 4 $cm^3/g$. Surface area is generally in the range of 10 $m^2/g$ to 700 $m^2/g$, more preferably 50 $m^2/g$ to 500 $m^2/g$.

The metal alkyl is any metal alkyl capable of alkylating the precatalyst, including mixed metal alkyls which may include, in addition to metal-bonded alkyl groups, halo groups, aryl groups, or alkoxy groups, and which are effective to obtain the benefits of the subject invention, i.e. enhanced polymerization activity, increased storage stability, increased bulk density, and/or low polydispersity.

The preferred metal alkyls are metal alkyls containing substantially only metal and hydrocarbon groups, including at least one alkyl group, i.e. dialkylmagnesium compounds, trialkylaluminum compounds, and the like, or mixed compounds of these. Also suitable are reaction products of metal alkyls with less than an equivalent amount of an alkanol, to form alkyl- and alkoxy-substituted metals such as dialkylalkoxyaluminum. Preferably, the metal alkyls are trialkylaluminum compounds.

The alkyl groups of the metal alkyl compounds are $C_{1-30}$ alkyl groups, preferably $C_{1-8}$ alkyl groups, more preferably $C_{1-4}$ alkyl groups, and most preferably $C_{2-4}$ alkyl groups. The alkyl groups may be branched or unbranched, and may be substituted with non-interfering substituents. A non-interfering substituent is identified as one which does not interfere with the use of the metal alkyl for its intended purpose. Non-limiting examples include aryl, cycloalkyl, alkaryl, aralkyl, cyano, alkoxy, and in some cases, fluoro and fluoroalkyl groups.

Preferably, the alkyl groups are linear $C_{1-4}$ alkyl groups, and most preferably, $C_{2-4}$ linear alkyl groups. It has been found, for example, that branched alkyl groups such as i-butyl groups do not offer the improvements desired when used with some precatalysts and/or under certain polymerization conditions, although an increase in polymer bulk density may be obtained. In the case of such branched alkyl alkylating agents, it may be advantageous to employ a different scavenger in the polymerization, or to employ different auxiliaries such as surface modifiers or antistatic agents. Preferred metal alkyls include trimethylaluminum, triethylaluminum, tri(n-propyl)aluminum, and tri(n-butyl) aluminum.

The precatalyst and non-coordinating anion may be deposited onto the support by any method, and in any order. In addition, the precatalyst and activator may be prereacted to form a solution or dispersion which is then deposited on the support. The ratio of transition metal of the precatalyst to ionic activator may be any ratio which provides suitable polymerization activity. Preferably, the ratio of transition metal to anion is from 0.3:1 to 1:0.3, more preferably 0.5:1 to 1:0.5, and most preferably 0.6:1 to 1:0.6. It is preferable that the anion be present in excess.

The ratio of the metal of the alkylating agent to transition metal of the precatalyst is sufficient to prepare an active catalyst, and preferably in the range of 0.5 to 20 in the prealkylation of the supported catalyst, more preferably 0.5 to 10, yet more preferably in the range of 1 to 5, and most preferably in the range of 2 to 4, on a mol/mol basis based on the respective metals. The range may be adjusted by one skilled in the art depending upon the polymerization activity of the catalyst system, the polymerization conditions, and the desired polymer product properties.

Due to the presence of minute traces of impurities in the reactant and solvent (if any) feed streams, particularly water, metal alkyls such as trialkylaluminum compounds are sometimes added to the olefin polymerization reactor even when the precatalyst has been activated by alumoxanes rather than ionic activators. The metal alkyls are believed to act as scavengers, particularly with respect to water, and are so termed herein. The amount of scavenger employed may be varied over a wide range, but is typically in the range of 30:1 to 500:1 based on mol of alkylating agent metal to transition metal of the precatalyst, more preferably 50:1 to 400:1, and most preferably 200:1 to 300:1.

The precatalyst and ionic activator may be applied to the porous support by slurry or paste techniques using relatively large solution volume to pore volume ratios, or by an incipient wetness technique. However, prealkylation must be performed using the incipient wetness technique. In general, the support is calcined, for example at 400–800° C., and may also be treated with a hydrophobicizing treatment, i.e., hexamethyldisilazane, trimethylchlorosilane, or the like, to reduce the concentration of surface hydroxyl groups prior to deposition of active catalyst system components. Treatment with hydrophobicizing agent may take place prior to or after calcination. Deposition of precatalyst, anionic activator, or mixtures of reaction products thereof then follows. Deposition is preferably effected by supplying the various components in solution, the ratio of solution volume to pore volume of catalyst preferably ranging from 0.1:1 to 1000:1, more preferably 0.5:1 to 10:1, and yet more preferably 0.8:1 to 4:1 at any given time. The incipient wetness technique may be used, employing, in general, not more than a 2:1 liquid/pore volume ratio, preferably 1.5:1 to 0.5:1. The precatalyst and anionic activator may be spray applied. The catalyst components may be applied in a single stage or multiple stages, optionally with drying between stages, preferably such that the supported catalyst appears dry and free-flowing or only slightly damp, and does not form a paste or slurry at any time during catalyst system ingredient deposition.

Following deposition of the precatalyst and anionic activator, regardless of whether the incipient wetness method for precatalyst and activator deposition has been employed, the treated support is dried, if necessary, to remove residual solvent to the point where a relatively free flowing powder is obtained. Drying is effected in vacuo or in an inert gas atmosphere, e.g. nitrogen, helium, argon, or the like, these gases preferably having been previously dried to eliminate moisture. The residual solvent content is preferably less than 50 weight percent based on "dried" catalyst, more preferably less than 20 weight percent, yet more preferably less than 10 weight percent, and most preferably less than 2 weight percent. The drying temperature is preferably between 40° C. and 200° C., more preferably between 50° C. and 100° C. The amount of retained solvent is not overly critical so long as it does not interfere with subsequent addition of metal alkyl by the incipient wetness technique. Preferably, substantially all solvent is removed.

Following addition of the precatalyst and anionic activator and drying the intermediate supported catalyst, the metal alkyl is added by an incipient wetness technique. In the incipient wetness technique, the volume of metal alkyl solution added is such that a slurry or paste will not be obtained. Rather, the catalyst appears relatively dry, although perhaps not quite so free-flowing. In general, at no given time will the ratio of solution volume to pore volume exceed 2, and this ratio is preferably less than 1.8, more preferably in the range of 0.5 to 1.6, and most preferably in the range of 0.8 to 1.5. The metal alkyl may, for example, be applied in two or more portions, with some drying of the catalyst occurring between additions. Preferably, all metal alkyl is added at once, as a solution in hydrocarbon solvent, and preferably at a solution to pore volume ratio of about 1.5:1 or less. Preferred solvents are aromatic solvents such as toluene and xylene, and lower alkanes such as pentane, hexane, cyclopentane, heptane, and the like. Following addition of the metal alkyl solution, the prepared catalyst may optionally be dried under inert gas or by vacuum.

The supported catalysts are employed in conventional olefin polymerization processes, preferably gas phase and slurry polymerization. They may be used alone or in conjunction with additional catalysts of different composition, containing the same or different cocatalysts, and prepared by the same or different methods. During the polymerization, a scavenger is typically added. The scavenger may be the same metal alkyl employed in prealkylation of the supported precatalyst and ionic activator, or may be a different metal alkyl or mixture of metal alkyls.

When the monomer comprises ethylene, optionally with $C_{3-8}$ comonomers for example, the polymerization may be conducted in a slurry-type polymerization reactor at 500 psi total pressure at 70° C., with or without hydrogen co-feed. Higher and lower temperatures and pressures may be used as well, these being readily selected by one skilled in the art. A light solvent such as i-butane, pentane, or hexane may be used as the liquid continuous phase. For higher olefins, i.e., propylene, the reaction is advantageously conducted in liquid monomer, at temperatures of about 60° C. The processes of olefin polymerization are well known to those skilled in the art, and the foregoing conditions are exemplary only, and not limiting. The polymerization may be conducted in the presence of antistats, chain transfer agents, etc., and may be conducted in single reactors, parallel plural reactors, series on figured reactors, or any combination of these. Gas phase reactors may also be employed. A description of the gas phase process is contained in U.S. Pat. No. 4,003,712, incorporated herein by reference.

The following examples illustrate the various embodiments of the present invention. Those skilled in the art will recognize many variations that are within the spirit of the present invention and scope of the claims.

Precatalyst A

Neat hexamethyldisilazane (HMDS), in an amount equivalent to 12.5 weight percent of the silica, was slowly added with stirring to Davison 948 silica and mixed for 2 hours. The HMDS-treated silica was then dried at 600° C. for 6 hours in a fluidized bed dryer with dry nitrogen gas flow. A solution of biscyclopentadienyl)zirconium dichloride (0.023 g, 0.08 mmol) and trityl tetrakis (pentafluorophenyl)borate (0.092 g, 0.10 mmol) in toluene (1.5 mL) was added to the HMDS-treated silica (1.0 g) at room temperature. The catalyst was then dried in vacuo to form a free-flowing powder.

Precatalyst B

A solution of rac-$Me_2$Si(indenyl)zirconium dichloride (0.036 g, 0.08 mmol) and trityl tetrakis(pentafluorophenyl) borate (0.108 g, 0. 12 mmol) in toluene (2.0 mL) was added to the HMDS-treated silica (1.0 g; prepared as in precatalyst Example A) at room temperature. The catalyst was then dried in vacuo to form a free-flowing powder.

Invention Example 1 and Comparative Examples C1 & C2

Polymerizations were run with and without pre-mixing Precatalyst A with a heptane solution of TEAL. Invention Example 1 was conducted using 20 mg of a prealkylated catalyst made by pre-mixing TEAL (0.6 ml, 0.1 mol/L, Al:Zr=2) and Precatalyst A (0.4 gm) by incipient wetness then drying to a free-flowing powder. Comparative Example 1 was conducted without a pre-mixing step. Comparative Example 2 was conducted after pre-mixing TEAL (0.5 ml, 0.4 mol/L, Al:Zr=135) and Precatalyst A (20 mg) for 1 hour before addition into the polymerization reactor.

Slurry polymerizations were conducted in a stirred 1.0-liter, stainless-steel reactor. Polymerization was run at 70° C. and 500 psi. Dry, oxygen-free isobutane (400 mL) was charged to the reactor at room temperature along with 50 mL of 1-butene and TEAL in the amount specified in Table 1. The reactor was then heated to 70° C. and allowed to equilibrate. Ethylene was then introduced to increase reactor pressure to 500 psig, and the reactor was allowed to equilibrate again. Catalyst (20 mg) was then injected into the reactor along with 50 mL of isobutane. Ethylene was then fed to the reactor continuously to maintain a constant pressure. At the end of one hour, ethylene flow was stopped and the reactor vented to remove the isobutane and unreacted ethylene. Results are shown in Table 1.

Invention Example 2 and Comparative Examples C3 & C4

Polymerizations were run with and without pre-mixing Precatalyst B with a heptane solution of TEAL. Invention Example 2 was conducted using 50 mg of a pre-alkylated catalyst made by pre-mixing TEAL (0.2 ml, 0.16 mol/L, Al:Zr=2.7) and Precatalyst B (0.145 gm) by incipient wetness then drying to a free-flowing powder. Comparative Example 3 was conducted without a pre-mixing step. Comparative Example 4 was conducted after pre-mixing TEAL (0.4 ml, 1.6 mol/L, Al:Zr=135) and Precatalyst B (50 mg) for 1 hour before addition into the polymerization reactor.

Slurry polymerizations were conducted in a stirred 1.0-liter, stainless-steel reactor. Polymerization was run at 80° C. and 400 psi. Dry, oxygen-free isobutane (400 mL) was charged to the reactor at room temperature along with TEAL in the amount specified in Table 1. The reactor was then heated to 80° C. and allowed to equilibrate. Ethylene was then introduced to increase reactor pressure to 400 psig, and the reactor was allowed to equilibrate again. Catalyst (50 mg) was then injected into the reactor along with 50 mL of isobutane. Ethylene was then fed to the reactor continuously to maintain a constant pressure. At the end of one hour, ethylene flow was stopped and the reactor vented to remove the isobutane and unreacted ethylene. Results are shown in Table 1.

TABLE 1

| Example | Precatalyst | Precatalyst Al/Zr ratio | Scavenger Al/Zr ratio | Activity, g polymer/ g cat/hr | Polymer Bulk Density | $M_w$ | $M_w/M_n$ |
|---|---|---|---|---|---|---|---|
| C1[1] | A | 0 | 270 | 1055 | 0.316 | 169,300 | 3.4 |
| C2[1] | A-prealkylated | 135 | 135 | 2275 | 0.285 | 175,700 | 3.4 |
| 1[1] | A-prealkylated | 2 | 270 | 1800 | 0.370 | 148,700 | 3.1 |
| C3[2] | B | 0 | 320 | 190 | 0.246 | 209,000 | 5.4 |
| C4[2] | B-prealkylated | 160 | 160 | 640 | 0.318 | 208,000 | 4.8 |
| 2[2] | B-prealkylated | 2.7 | 320 | 630 | 0.367 | 155,000 | 4.0 |

[1]Ethylene/butane copolymerization, 500 psi, 70° C., 50 ml butene, no hydrogen. Catalyst contains 0.8 mmol $Cp_2ZrCl_2$ and 0.10 mmol tetrakis[pentafluorophenyl]borate/g.
[2]Ethylene homopolymerization, 400 psi, 80° C., no hydrogen. Catalyst contains 0.08 mmol rac-$Me_2Si$(indenyl)$_2ZrCl_2$ and 0.12 mmol tetrakis[pentafluorophenyl]borate/g.

The table shows that prealkylation of the supported catalyst with significant amounts of metal alkyl, i.e. Comparative Examples C2 and C4, increases catalyst activity sharply as compared to the same reaction employing addition of metal alkyl only to the reactor. However, polymer bulk density decreases in the case of copolymers (Comparative Example C2) and polydispersity is essentially unchanged. In the case of homopolymers of ethylene, bulk density increases and polydispersity decreases when substantial portions of metal alkyl are applied to the supported catalyst as compared to addition only to the reactor, but only by a limited amount. Preparation of supported catalyst by pre-alkylating with a limited amount of metal alkyl and employing the incipient wetness technique (Examples 1, 2) also achieves a marked increase in catalyst activity. Polymer bulk density also markedly improved in each invention example, along with a decrease in polydispersity.

Polymerization Example 3 and Comparative Examples C5 & C6

A series of ethylene homopolymerizations were conducted as in Example 2 and Comparative Examples C3 and C4 employing Precatalyst B. In Comparative Example C5 the precatalyst was not prealkylated, while in Comparative Example C6 the precatalyst was prealkylated with a large amount of tri(i-butyl)aluminum ("TiBAl") alkylating agent. Subject invention Example 3 employed prealkylation with TiBAl at an Al/Zr ratio of only 2.7 (by incipient wetness). The total alkylating agent plus scavenger content was kept substantially the same to facilitate comparison. The results are presented in Table 2.

TABLE 2

| Example | Prealkylation (Al/Zr) | Scavenger (Al/Zr) | Activity g/gcat/hr | Bulk Density g/cm³ | $M_w$ | $M_w/M_n$ |
|---|---|---|---|---|---|---|
| C5 | None | TiBAl (320) | 760 | 0.08 | 152,000 | 3.6 |
| C6 | TiBAl (160) | TiBAl (160) | 340 | — | 195,000 | 3.8 |
| 3 | TiBAl (2.7) | TiBAl (320) | 525 | 0.16 | 160,000 | 3.5 |

The results in Table 2 indicate, in general, that TIBAl is not an optimal prealkylating agent/scavenger for the particular catalyst under the polymerizable conditions employed. Bulk density was low for all products, and each polymerization exhibited fouling. The subject invention run, however, did display an increase in bulk density over the C5 example where all the alkylating agent was added during the reaction as opposed to limited prealkylation.

Polymerization Example 4 and Comparative Examples C7 and C8

Propylene homopolymerizations were run with and without pre-mixing Precatalyst B with a heptane solution of TEAL. Invention Example 4 was conducted using 50 mg of a pre-alkylated catalyst made by pre-mixing TEAL (0.2 ml, 0.16 mol/L, Al:Zr=2.7) and Precatalyst B (0.145 gm) by incipient wetness then drying to a free-flowing powder. Comparative Example C7 was conducted without a pre-mixing step. Comparative Example C8 was conducted after pre-mixing TEAL (0.4 ml, 1.6 mol/L, Al:Zr=135) and Precatalyst B (50 mg) for 1 hour before addition into the polymerization reactor.

Polymerizations were conducted in a stirred 1.0-liter, stainless-steel reactor. Polymerization was run at 60° C. with liquid propylene. Dry, oxygen-free propylene (400 mL) was charged to the reactor at room temperature along with TEAL in the amount specified in Table 3. The reactor was then heated to 60° C. and allowed to equilibrate. Catalyst (50 mg) was then injected into the reactor along with 50 mL of isobutane. At the end of one hour, the reactor was vented to remove the isobutane and unreacted propylene. Results are shown in Table 3.

TABLE 3

| Example | Prealkylation (Al/Zr) | Scavenger (Al/Zr) | Activity g/gcat/hr | Bulk Density g/cm³ | $M_w$ | $M_w/M_n$ |
|---|---|---|---|---|---|---|
| C7 | None | TEAL (200) | 70 | Lumps, Fouling | — | — |
| C8 | TEAL (100) | TEAL (100) | 210 | Fouling | — | — |
| C8[1] | TEAL (160) | TEAL (160) | 130 | Lumps, Fouling | 44,700 | 2.7 |
| 4[1] | TEAL (2.7) | TEAL (320) | 100 | 0.15 Fine Powder | 47,800 | 2.7 |

[1]Catalyst aged 6 months.

The results presented in Table 3 indicate that the supported catalysts of the present invention exhibit higher polymerization activity when prealkylated. While the subject invention catalyst activity is somewhat less than a supported catalyst treated with a large amount of alkylating agent (Comparative Example C8), the morphology of the subject invention product is considerably better than either Comparative Example.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A prealkylated supported olefin polymerization catalyst prepared by the process of
   a) supplying a finely divided porous support material having deposited thereon catalyst system components comprising a transition metal or inner transition metal complex single site precatalyst and a bulky, non-coordinating anion activator;
   b) prealkylating said finely divided support material with a solution of metal alkyl dissolved in organic solvent in a mol ratio of metal of the metal alkyl to transition metal or inner transition metal of the precatalyst of less than 20:1, wherein the solution volume at any given time does not exceed the pore volume of the finely divided porous support material by an extent which would create a paste or dispersion, to form a prealkylated catalyst; and
   c) optionally drying said prealkylated catalyst to remove organic solvent.

2. The supported catalyst of claim 1, wherein said solution volume is less than or equal to twice the pore volume.

3. The supported catalyst of claim 1, wherein the metal alkyl is an alkylaluminum.

4. The supported catalyst of claim 1, wherein the mol ratio of the metal of the metal alkyl to the transition metal or inner transition metal of the precatalyst is from 0.5:1 to 20:1.

5. The supported catalyst of claim 1, wherein the mol ratio of the metal of the metal alkyl to the transition metal or inner transition metal of the precatalyst is from 0.5:1 to 10:1.

6. The supported catalyst of claim 1, wherein said metal alkyl comprises a trialkyl aluminum compound.

7. The supported catalyst of claim 1, wherein said metal alkyl comprises an alkyl aluminum containing from 1 to 3 $C_{1-4}$ linear alkyl groups.

8. In a process for the polymerization of olefin monomers wherein one or more olefin monomers are polymerized in the presence of a supported catalyst containing a transition metal or inner transition metal single site precatalyst and a bulky, non-coordinating anion activator, the improvement comprising polymerizing said olefin monomers in the presence of a catalyst comprising the prealkylated catalyst of claim 1 and adding to the polymerization reactor an amount of metal alkyl scavenger which is from 50 to 1000 times the amount of transition metal or inner transition metal contained in said prealkylated catalyst on a mol/mol basis.

9. In a process for the polymerization of olefin monomers wherein one or more olefin monomers are polymerized in the presence of a supported catalyst containing a transition metal or inner transition metal single site precatalyst and a bulky, non-coordinating anion activator, the improvement comprising polymerizing said olefin monomers in the presence of a catalyst comprising the prealkylated catalyst of claim 2 and adding to the polymerization reactor an amount of metal alkyl scavenger which is from 50 to 1000 times the amount of transition metal or inner transition metal contained in said prealkylated catalyst on a mol/mol basis.

10. In a process for the polymerization of olefin monomers wherein olefin monomers are polymerized in the presence of a supported catalyst containing a transition or inner transition metal single site precatalyst and a bulky, non-coordinating anion activator, the improvement comprising polymerizing said olefin monomers in the presence of a catalyst comprising the prealkylated catalyst of claim 3 and adding to the polymerization reactor an amount of transition metal or inner transition metal alkyl which is from 50 to 1000 times the amount of metal contained in said alkylated catalyst on a mol/mol basis.

11. In a process for the polymerization of olefin monomers wherein olefin monomers are polymerized in the presence of a supported catalyst containing a transition or inner transition metal single site precatalyst and a bulky, non-coordinating anion activator, the improvement comprising polymerizing said olefin monomers in the presence of a catalyst comprising the prealkylated catalyst of claim 4 and adding to the polymerization reactor an amount of metal alkyl which is from 50 to 1000 times the amount of transition metal or inner transition metal contained in said alkylated catalyst on a mol/mol basis.

12. In a process for the polymerization of olefin monomers wherein olefin monomers are polymerized in the presence of a supported catalyst containing a transition or inner transition metal single site precatalyst and a bulky, non-coordinating anion activator, the improvement comprising polymerizing said olefin monomers in the presence of a catalyst comprising the prealkylated catalyst of claim 5 and adding to the polymerization reactor an amount of metal alkyl which is from 50 to 1000 times the amount of transition metal or inner transition metal contained in said alkylated catalyst on a mol/mol ratio.

13. In a process for the polymerization of olefin monomers wherein olefin monomers are polymerized in the presence of a supported catalyst containing a transition or inner transition metal single site precatalyst and a bulky, non-coordinating anion activator, the improvement comprising polymerizing said olefin monomers in the presence of a catalyst comprising the prealkylated catalyst of claim 6 and adding to the polymerization reactor an amount of metal alkyl which is from 50 to 1000 times the amount of transition metal or inner transition metal contained in said alkylated catalyst on a mol/mol basis.

14. In a process for the polymerization of olefin monomers wherein olefin monomers are polymerized in the presence of a supported catalyst containing a transition or inner transition metal single site precatalyst and a bulky, non-coordinating anion activator, the improvement comprising polymerizing said olefin monomers in the presence of a catalyst comprising the prealkylated catalyst of claim 7 and adding to the polymerization reactor an amount of metal alkyl which is from 50 to 1000 times the amount of transition metal or inner transition metal contained in said alkylated catalyst on a mol/mol basis.

15. The process of claim 8, wherein said metal alkyl employed to prealkylate said catalyst is triethylaluminum, in an amount such that and the mol ratio of aluminum to transition metal or inner transition metal of said precatalyst is from 0.5 to 5.

16. The process of claim 8, wherein said polymerization is a slurry polymerization process.

17. The process of claim 16, wherein the mol ratio of metal of said scavenger to transition metal or inner transition metal of said prealkylated catalyst is from 50:1 to 400:1.

18. In a process for the polymerization of olefin monomers wherein one or more olefin monomers are polymerized in the presence of a supported catalyst containing a transition metal or inner transition metal single site precatalyst and a bulky, non-coordinating anion activator, the improvement comprising polymerizing said olefin monomers in the presence of a catalyst comprising a prealkylated supported catalyst prepared by the process of a) supplying a finely divided porous support material having deposited thereon catalyst system components comprising a transition metal or inner transition metal complex single site precatalyst and a bulky, non-coordinating anion activator;

b) prealkylating said finely divided support material with a solution of metal alkyl dissolved in organic solvent in a mol ratio of metal of the metal alkyl to transition metal or inner transition metal of the precatalyst of less than 20:1, wherein the solution volume at any given time does not exceed the pore volume of the finely divided porous support material by an extent which would create a paste or dispersion, to form a prealkylated catalyst;

c) optionally drying said prealkylated catalyst to remove organic solvent;

d) adding to the polymerization reactor an amount of metal alkyl scavenger which is from 50 to 1000 times the amount of transition metal or inner transition metal contained in said prealkylated catalyst on a mol/mol basis; and wherein said polymerization is a gas phase polymerization.

19. The process of claim 18, wherein the mol ratio of metal of said scavenger to transition metal or inner transition metal of said prealkylated catalyst is from 50:1 to 400:1.

* * * * *